(12) United States Patent
Welch (10) Patent No.: US 7,277,423 B1
(45) Date of Patent: Oct. 2, 2007

(54) METHOD AND SYSTEM FOR BUFFERING MEDIA TO REDUCE APPARENT LATENCY IN INITIATING A PACKET-BASED REAL-TIME MEDIA SESSION

(75) Inventor: David Welch, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 922 days.

(21) Appl. No.: 10/622,438

(22) Filed: Jul. 18, 2003

(51) Int. Cl.
*H04L 12/66* (2006.01)
(52) U.S. Cl. ............................................. 370/352
(58) Field of Classification Search ................ 370/352, 370/341, 389, 312; 455/517, 518
See application file for complete search history.

(56) References Cited

U.S. PATENT DOCUMENTS

| | | | |
|---|---|---|---|
| 4,870,408 A | 9/1989 | Zdunek et al. ............... 370/341 |
| 5,442,809 A | 8/1995 | Diaz et al. ................... 455/511 |
| 5,568,511 A | 10/1996 | Lampe ........................ 370/341 |
| 5,710,591 A | 1/1998 | Bruno et al. .............. 348/14.09 |
| 5,818,836 A | 10/1998 | DuVal ........................ 370/389 |
| 5,850,611 A | 12/1998 | Krebs ......................... 455/518 |
| 5,884,196 A | 3/1999 | Lekven et al. ............... 455/574 |
| 5,936,964 A | 8/1999 | Valko et al. ................. 370/468 |
| 5,983,099 A | 11/1999 | Yao et al. ................. 455/426.1 |
| 6,014,556 A | 1/2000 | Bhatia et al. ............. 455/404.1 |
| 6,032,051 A | 2/2000 | Hall et al. ................... 455/518 |
| 6,041,241 A | 3/2000 | Willey ........................ 455/574 |
| 6,119,017 A | 9/2000 | Cassidy et al. .............. 455/518 |
| 6,178,323 B1 | 1/2001 | Nagata ........................ 455/516 |
| 6,381,467 B1 | 4/2002 | Hill et al. .................... 455/519 |
| 6,477,150 B1 | 11/2002 | Maggenti et al. ........... 370/312 |
| 6,490,452 B1 | 12/2002 | Boscovic et al. ............ 455/436 |
| 6,526,377 B1 | 2/2003 | Bubb ......................... 704/211 |
| 6,564,049 B1 | 5/2003 | Dailey ........................ 455/416 |
| 6,668,167 B2 | 12/2003 | McDowell et al. ........ 455/412.1 |
| 7,020,098 B2 * | 3/2006 | Ehrsam et al. .............. 370/260 |
| 2002/0034941 A1 | 3/2002 | Patil et al. ................... 455/423 |
| 2002/0055364 A1 | 5/2002 | Wang et al. ................. 455/466 |
| 2002/0058523 A1 | 5/2002 | Maggenti et al. ........... 455/517 |
| 2002/0071445 A1 | 6/2002 | Wu et al. .................... 370/441 |
| 2002/0145990 A1 | 10/2002 | Sayeedi ...................... 370/335 |
| 2002/0147818 A1 | 10/2002 | Wengrovitz ................. 709/228 |

(Continued)

FOREIGN PATENT DOCUMENTS

EP 0 817 457 1/1998

(Continued)

OTHER PUBLICATIONS

Qualcomm, Dispath Services on cdma2000, May 11, 2001.*

(Continued)

*Primary Examiner*—Wing Chan
*Assistant Examiner*—Lawrence J Burrowes (57) ABSTRACT

A method and system for buffering media at an initiating station. In response to a user request to initiate a packet-based real-time media session, such as a "push-to-talk" session for instance, the initiating station acquires a data connection. The station then determines that it has acquired a data connection, such as by determining that it has received incoming packet-data, and responsively begins receiving and buffering media, such as voice, from a user. Once the station successfully establishes the requested media session, or a leg of the session, the station then begins transmitting the buffered media to a remote endpoint.

21 Claims, 7 Drawing Sheets

U.S. PATENT DOCUMENTS

| | | | |
|---|---|---|---|
| 2002/0172165 A1 | 11/2002 | Rosen et al. ................ | 370/310 |
| 2002/0172169 A1 | 11/2002 | Rosen et al. ................ | 370/335 |
| 2002/0173308 A1 | 11/2002 | Dorenbosch et al. ....... | 455/435 |
| 2002/0173325 A1 | 11/2002 | Rosen et al. ................ | 455/518 |
| 2002/0173326 A1 | 11/2002 | Rosen et al. ................ | 455/515 |
| 2002/0173327 A1 | 11/2002 | Rosen et al. ................ | 455/518 |
| 2002/0177461 A1 | 11/2002 | Rosen et al. ................ | 455/518 |
| 2002/0191583 A1 | 12/2002 | Harris et al. ................ | 370/345 |
| 2002/0198008 A1 | 12/2002 | Smith et al. ................ | 455/466 |
| 2003/0008657 A1 | 1/2003 | Rosen et al. ............. | 465/452.1 |
| 2003/0021264 A1 | 1/2003 | Zhakov et al. .............. | 370/352 |
| 2003/0032448 A1 | 2/2003 | Bulthuis et al. ......... | 455/556.1 |
| 2003/0083045 A1 | 5/2003 | Blight et al. ............. | 455/412.1 |
| 2003/0100326 A1 | 5/2003 | Grube et al. ................ | 455/515 |
| 2003/0114156 A1 | 6/2003 | Kinnavy ...................... | 455/434 |
| 2003/0114174 A1 | 6/2003 | Walsh et al. ................ | 455/466 |
| 2003/0119540 A1 | 6/2003 | Mathis ....................... | 455/518 |
| 2003/0125062 A1 | 7/2003 | Bethards et al. ............ | 455/517 |
| 2003/0190888 A1* | 10/2003 | Mangal et al. ............. | 455/3.05 |
| 2004/0014456 A1 | 1/2004 | Vaananen ................... | 455/413 |

FOREIGN PATENT DOCUMENTS

| | | |
|---|---|---|
| EP | 0 984 608 | 3/2000 |

OTHER PUBLICATIONS

International Search Report form International Application No. PCT/US02/31411, dated Mar. 4, 2003.
International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct. 22, 2002 entitled "Method for Call Setup Using Short Data Bursts".
U.S. Appl. No. 10/067,028, filed Feb. 4, 2002 entitled "Method and System for Reducing Latency When Initiating Real-Time Media Sessions".
3rd Generation Partnership Project 2 "3GPP2", Fast Call Set-Up, Version 1.0, Apr. 15, 2002.
Mobile Tornado, http://www.mobiletornado.com/products_iprsptt.html, printed from the World Wide Web on Jan. 27, 2003.
"Qualcomm Chats Up 'Push-to-Talk'," http://siliconvalley.internet.com/news/print.php/953261, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Campbell and Sparks, "Control of Service Context Using SIP Request—URI," Network Working Group, Apr. 2001.
Ericsson, www.telecomcorridor.com/wireless%20horizons/1Coyne.pdf, printed from the World Wide Web on Jun. 27, 2001.
Dirk Kutscher/Jorg Ott, "The Message Bus—A Communication & Integration Infrastructure for Component-Based Systems," White Paper, Jan. 2000.
Ott et al., "A Message Bus for Local Coordination," Network Working Group, Internet-Draft, May 30, 2001.
TR45, Medium Access Control (MAC) Standard for cdma2000 Spread Spectrum System, IS-2000-3, Jul. 12, 1999.
3rd Generation Partnership Project 2 '3GPP2', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley et al., "SDP: Session Description Protocol," Internet Engineering Task Force Request for Comment 2327, Apr. 1998.
Handley et al., "SIP: Session Initiation Protocol," Internet Engineering Task Force Request for Comment 2543, Mar. 1999.
Fielding et al., "Hypertext Transfer Protocol—HTTP/1.1," Internet Engineering Task force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
Oma, Discussion and definitions on PoC Floor Control, Input Contribution, Doc #OMA-REQ-2003-0375-PoC_Floor_Control, Jun. 2, 2003.
Oma, "PoC Use case: Mobile—PC Example," Input Contribution, Doc #OMA-REQ-2003-0323 PoC Mobile-PC use case, May 5, 2003.
Oma, "PoC Use case: Multimedia Group Call Example," Input Contribution, Doc #OMA-REQ-2003-0306-PoC UseCase-group-multimedia-scenario, May 6, 2003.
Oma, "PoC Use case: Examples of User Requirements," Input Contribution, Doc #OMA-REQ-2003-0305-PoC Use Case, May 6, 2003.
Oma, "Inputs for PoC Requirements Document," Input Contribution, Doc #OMA-REQ-2003-0367-PoC_Input_Motorola, May 29, 2003.
Oma, "Push to Talk over Cellular (PoC)," Version: 0.1.6, May 12, 2003.
International Search Report from International Application No. PCT/US2003/02950, dated Jan. 30, 2003.
Office Action from U.S. Appl. No. 10/067,080, dated May 21, 2003.
Office Action from U.S. Appl. No. 10/067,080, dated Apr. 27, 2004.
Douskalis, (2000) *IP Telephony: The Integration of Robust VoIP Services*, 36-69.
U.S. Appl. No. 10/067,080, filed Feb. 4, 2002 entitled "Method and System for Selectively Reducing Call-Setup Latency Through Management of Paging Frequency".

* cited by examiner

METHOD AND SYSTEM FOR BUFFERING MEDIA TO REDUCE APPARENT LATENCY IN INITIATING A PACKET-BASED REAL-TIME MEDIA SESSION

BACKGROUND

1. Field of the Invention

The present invention relates to network communications and, more particularly, to the establishment of packet-based real-time media sessions.

2. Description of Related Art a. Real-Time Media Conferencing

As a general matter, it is known to establish a real-time media conference over a packet-switched network between multiple user stations, each operated by a respective user. A communication server, such as a multipoint conference unit (MCU) for instance, can reside functionally in the network and can operate as a bridging or switching device between the participating stations, to support the conference session.

In practice, a participating station might initiate the conference session by sending to the communication server a session setup message that identifies the other desired participant(s). The server may then seek to connect each of the designated other participants, such as by forwarding the session setup message or sending a new session setup message to each other party. Ultimately, the server would thereby establish a conference leg with each participating station, including the initiating station, and the server would then bridge together the legs so that the users at the stations can confer with each other, exchanging voice, video and/or other media in real-time via the server.

A signaling mechanism such as the well known Session Initiation Protocol (SIP) could be used to initialize the conference and more particularly to set up each conference leg. Further, digitized media could be packetized and carried between each participating station according to a mechanism such as the well known Real-time Transport Protocol (RTP), for instance. The core industry standards for SIP (Internet Engineering Task Force (IETF) Request Comments (RFC) 2543) and RTP (IETF RFC 1889) are hereby incorporated by reference.

Packet based media conferencing can be advantageously employed to provide an "instant connect" service, where a user of one station can readily initiate a real-time media conference with one or more designated target users at other stations. The initiating user may simply select a target user or group and then press an instant connect button on his or her station, and the user's station would responsively signal to a communication server to initiate a conference between the initiating user and the selected user or group. This sort of service is referred to as "instant connect" because it strives to provide a quick connection between two or more users, in contrast to telephone service where a user dials a telephone number of a party and waits for a circuit connection to be established with that party.

An example of an instant connect service is commonly known as "push-to-talk" (PTT). In a PTT system, some or all of the conference stations are likely to be wireless devices such as cellular mobile stations, that are equipped to establish wireless packet-data connectivity and to engage in voice-over-packet (VoP) communication. Alternatively, some or all of the stations could be other sorts of devices, such as multimedia personal computers or Ethernet-telephones, that can establish packet data connectivity and engage in VoP communication through landline connections. Further, each station could be equipped with a PTT button or other mechanism that a user can engage in order to initiate an PTT session or to request the floor during an ongoing session.

In practice, a user of a PTT-equipped mobile station might select a target user or group of users from a contact list or other program menu and engage the PTT button to initiate a conference session with that user or group. In response, the mobile station may then send a session initiation message to the communication server, to set up a conference session in the manner described above for instance, and the user could begin talking with the other users. Further, a similar mechanism could be applied to establish real-time media conferences carrying video or other media as well.

b. Setup Latency

Ideally, a wireless instant-connect system should simulate instant 2-way radio communication. For instance, when a user initiates a PTT session, the user will want to be able to press the PTT button and immediately begin talking to each other party "on the channel." Unfortunately, however, communications in the wireless environment can result in unacceptable call setup latencies on the order of 6 or even 10 seconds.

In general, this setup latency may arise at the initiating end and/or at the target end(s), because the initiating mobile station and/or target mobile station may need to acquire data connections (radio links and data links) before communication begins. Further, additional delay can arise as the communication server works to set up communication with the endpoints.

At the initiating end, for example, if the mobile station is dormant (having a data link but no radio link), the mobile station may need to request a radio link traffic channel before it can begin communicating with the communication server, and the process of requesting and waiting for a channel assignment can take some time. Further, once the initiating mobile station has acquired a radio link and thus switched from a dormant state to an active state, the mobile station may send an initiation request such as a SIP "INVITE" to the server, and it may then take some time for the server to set up an RTP leg with each participating station. Still further, if the initiating mobile station does not currently have a data-link layer connection when a user seeks to initiate a PTT session, additional delay may result as the mobile station works to establish that connection.

In turn, for each target mobile station, a radio access network may receive a termination request, such as an INVITE message, that is to be delivered to the target mobile station. If the target mobile station is dormant, the radio access network would then page the target station and await a response. This paging process can be a large source of call-setup latency if paging is carried out at only periodic time slots on the paging channel. Further, once a dormant mobile station receives a page, it may then respond to the page by requesting a traffic channel, which could add more delay. Still further, once the terminating mobile station has acquired a traffic channel, it may then need to work with the communication server to establish a conference leg, which could take still more time.

One way to reduce the impact of latency that occurs in setting up a packet-based real-time media session is to have an initiating station buffer an initial media transmission until a link exists to transmit the media further. This buffering process is described in U.S. patent application Ser. No. 10/067,028, filed Feb. 4, 2002, which is hereby incorporated by reference in its entirety.

This solution stems from the fact that setup latency will normally be unnoticeable to a user at a target station, as long as the target station ultimately receives the initial media transmission. For instance, if a user initiates a PTT session and immediately speaks to a target user, but the target user does not begin to receive the voice signal until 5 seconds later, the target user normally would not realize that there was a 5 second delay (since it is the start of the conversation). However, the initiating user would advantageously get the sense that communication is underway.

In particular, a user station can be arranged to begin receiving and buffering media in response to user initiation of a real-time media session. For instance, in a PTT system, a mobile station can be programmed to respond to user actuation of a PTT button by immediately beginning to receive, digitize and store voice spoken by the user. Once the mobile station establishes a conference leg with the communication server or once the session is set up through to one or more target users, the mobile station may then begin transmitting the digitized voice along to the server, for transmission in turn to each target user.

A further problem can arise, however, if an initiating mobile station begins to buffer media in response to user invocation of a real-time media session, and the mobile station then fails to acquire a data connection through which to establish the session and transmit the media. This can occur, for instance, if the mobile station has separate application-layer logic (e.g., a PTT application and SIP application) and lower-layer logic (e.g., logic for establishing physical, data-link and network layer connections).

In particular, when the application-layer logic receives a session initiation request from a user, the application-layer logic might (i) generate a SIP INVITE message and pass it to the lower-layer logic for transmission into the network and (ii) begin buffering the user's voice, with the assumption that a session is being set up. For one reason or another (e.g., network congestion or user-authentication problems), however, the lower-layer logic may be unable to establish a radio link or data link through which to send the INVITE message. Therefore, the mobile station would not successfully set up the expected session and therefore would not transmit the buffered voice into the network.

When this happens, the user will be disappointed to find out that the user's voice (or other media) is not sent to the other session participant(s). Such negative user experience is undesirable.

SUMMARY

The present invention provides an improved buffering mechanism, which helps to overcome the foregoing problem. In accordance with an exemplary embodiment of the invention, when an initiating station receives a user request to initiate a real-time media session, the station will wait until it has successfully acquired a data connection before beginning to receive and buffer media from the user. In this way, the invention can greatly increase the chances that the buffered media will ultimately be transmitted and can therefore greatly improve the user experience.

In particular, when a station receives a session initiation request from a user, the station may begin acquiring a data connection through which to set up and/or conduct the requested session. The station will then determine that it has successfully acquired the data connection and will responsively begin receiving and buffering media provided by the user (if the user provides media). On the other hand, if the station does not successfully acquire a data connection, then it would not begin receiving and buffering media from the user.

In the exemplary embodiment, the station can conclude that it has successfully acquired a data connection when the station first receives packet-data from the network, since receipt of packet-data would show that the station has a data connection. In the exemplary embodiment, the packet-data could be an IP packet carrying a SIP signaling message, or the packet-data could take other forms.

In a further aspect of the exemplary embodiment, the initiating station may notify a user when the station determines that it has successfully acquired a data connection, so that the user can know when to begin providing media to the station. For instance, the station can present the user with an audible or visual alert, such as a tone or light, in response to which the user may begin speaking into the station or otherwise providing media into the station.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Overview of Packet-Based

Real-Time Media Conferencing

Figure 1:
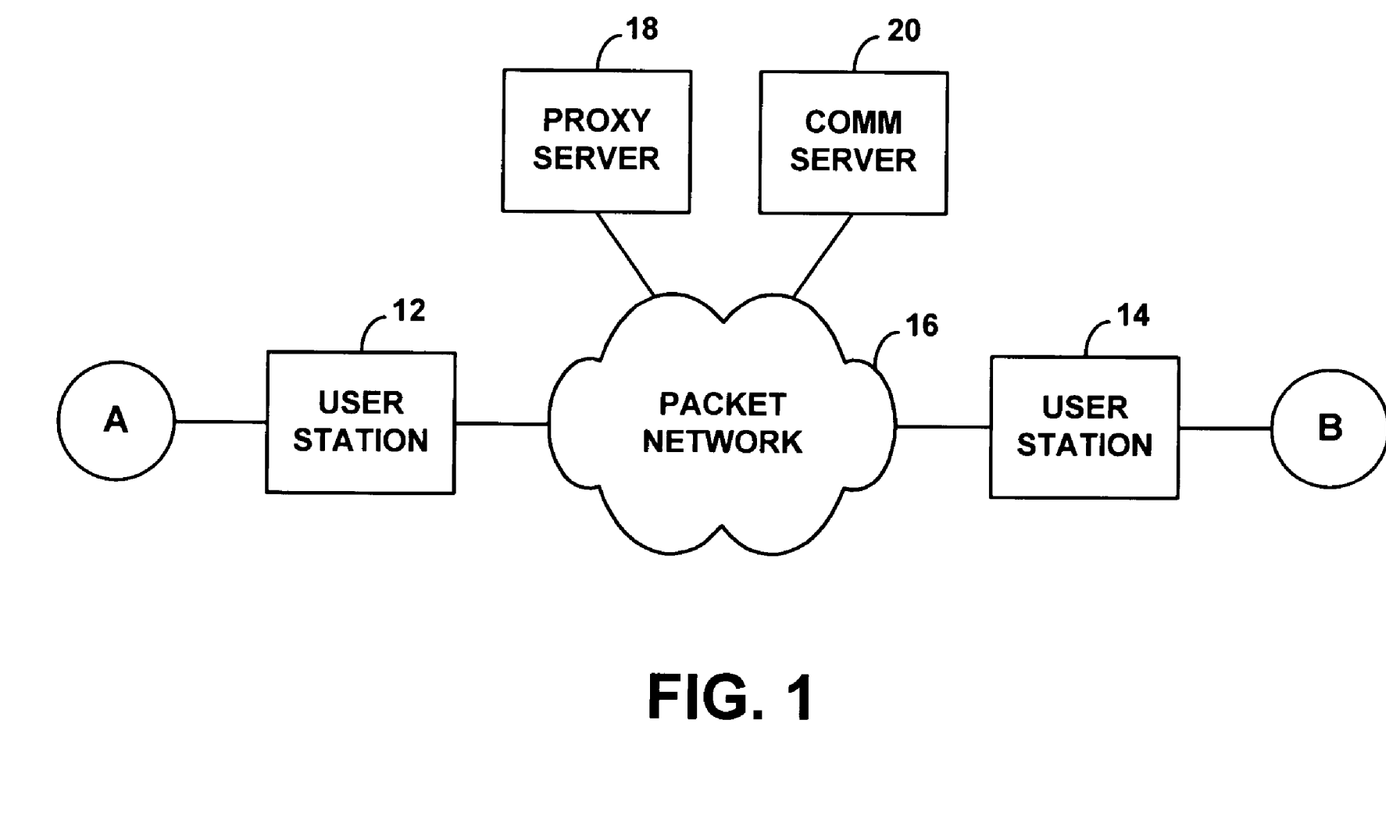
FIG. 1 is a block diagram of a communication system for carrying out packet-based real-time conferencing.

Referring to the drawings, FIG. 1 illustrates an exemplary communication system 10 arranged to provide packet-based real-time media conferencing. For simplicity, FIG. 1 depicts two user stations 12, 14, coupled with a common packet-switched network 16. User station 12 is operated by user A, and a user station 14 is operated by user B. Sitting on the packet network 16, by way of example, are then a proxy server 18 and a communication server 20.

It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

In the exemplary arrangement of FIG. 1, each user station 12, 14 is preferably equipped with hardware and logic to establish network connectivity and to set up and engage in packet-based real-time media sessions. To be able to establish network connectivity, for instance, each station may be equipped with a wireless or landline network interface module and logic to gain a data connection. To be able to set up a packet-based media session, each user station may then be programmed to engage in SIP signaling or other session initiation signaling. And to be able to communicate real-time media such as voice and/or video, each user station may be equipped with hardware to receive media from a user and to play out media to a user, as well as program logic to send and receive digital representations of the media according to RTP or another designated protocol.

Proxy server 18 may then be a signaling proxy that functions to forward or direct signaling messages from point to point through network 16. For instance, if SIP signaling is used, proxy server 18 could be a SIP proxy server.

Communication server 20, in turn, is also preferably equipped with hardware and logic to be able to set up media communications with each station and to bridge those communications together so as to allow users at the stations to communicate with each other. As such, communication server 20 may be programmed to engage in signaling communication according to SIP or another designated protocol, in order to set up a conference leg with each participating station. And communication server 20 may further be programmed to receive and send media streams according to RTP or another designated protocol.

Communication server 20 can be a discrete entity, such as an MCU. Alternatively, communication server 20 can comprise a number of components, such as (i) an MCU that bridges communications, and (ii) a controller that functions to set up and control conference legs through the MCU, using third party call control techniques, for instance. Other arrangements are also possible.

Figure 2:
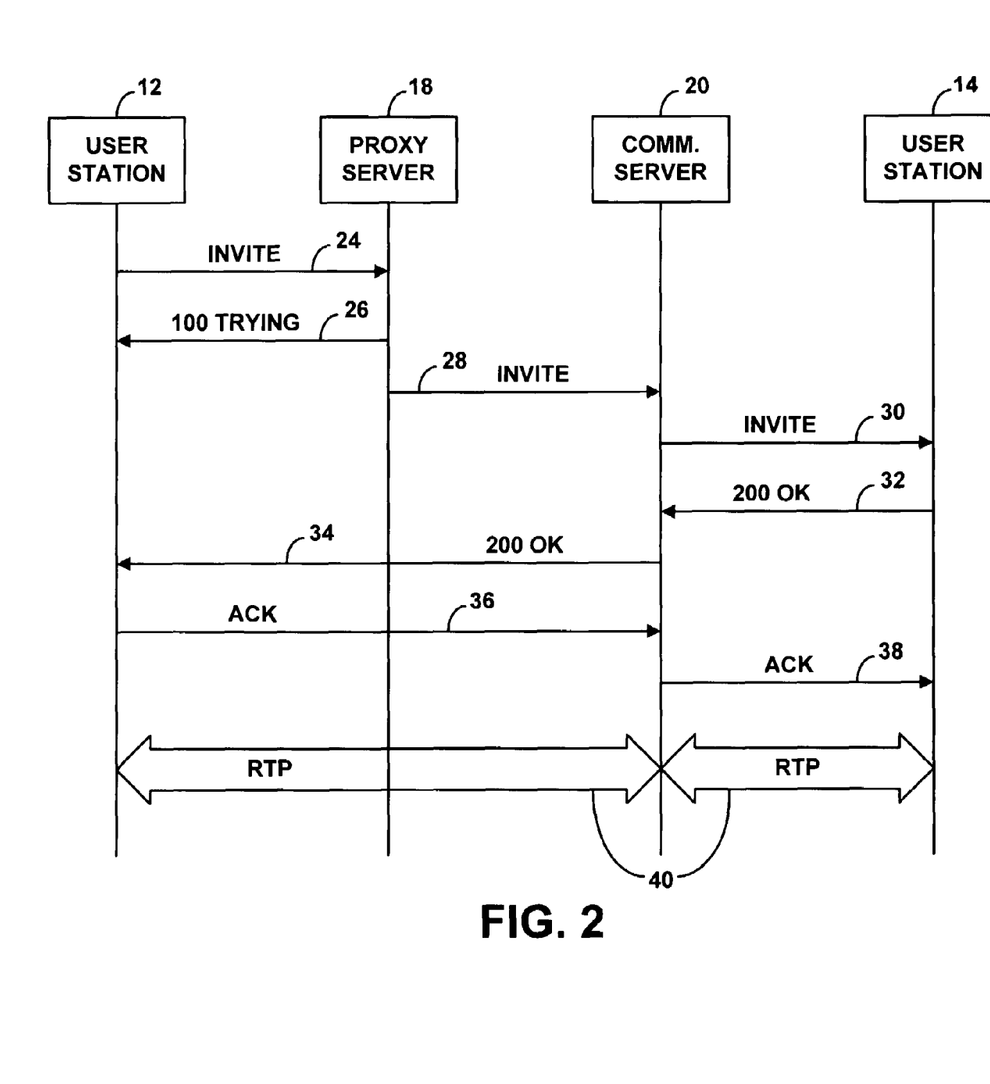
FIG. 2 is a message flow diagram showing an example of session setup signaling in the arrangement of FIG. 1.

FIG. 2 next depicts an exemplary method of setting up a packet-based real-time media conference session between users A and B in the arrangement of FIG. 1. As shown in FIG. 2, at step 24, in response to a request from user A to initiate a conference with user B, station 12 may initiate the conference by sending a SIP "INVITE" message to proxy server 18, destined to a predefined SIP address of communication server 20. The INVITE message may describe the type of session desired in accordance with the Session Description Protocol (SDP) and may designate user B as a target participant.

At step 26, after receiving the INVITE message, proxy server 18 then responds with a SIP "100 TRYING" message or other signal to acknowledge receipt of the INVITE message and to indicate that signaling is in process. Further, at step 28, proxy server 18 forwards the INVITE message to an IP address of the server 20 for handling.

Upon receipt of the INVITE message, at step 30, communication server 20 then sends an INVITE message to user B at user station 14, in an effort to set up a conference leg with user B. At step 32, upon receipt of the INVITE message, user station 14 responds with a SIP "200 OK" message indicating willingness to participate in the session. At step 34, communication server 20 then sends a 200 OK message to user station 12, similarly indicating willingness to participate in the session.

At step 36, user station 12 then responds to the communication server with a SIP "ACK" message, to complete set up of a conference leg between user station 12 and the server 20. And at step 38, the server similarly responds to user station 14 with an ACK message to complete set up of a conference leg between user station 14 and the server. At step 40, the server then engages in RTP communications with both user station 12 and user station 14 and bridges those communications together, so that users A and B can communicate with each other.

2. Example Instant-Connect System a. Network Architecture

Figure 3:
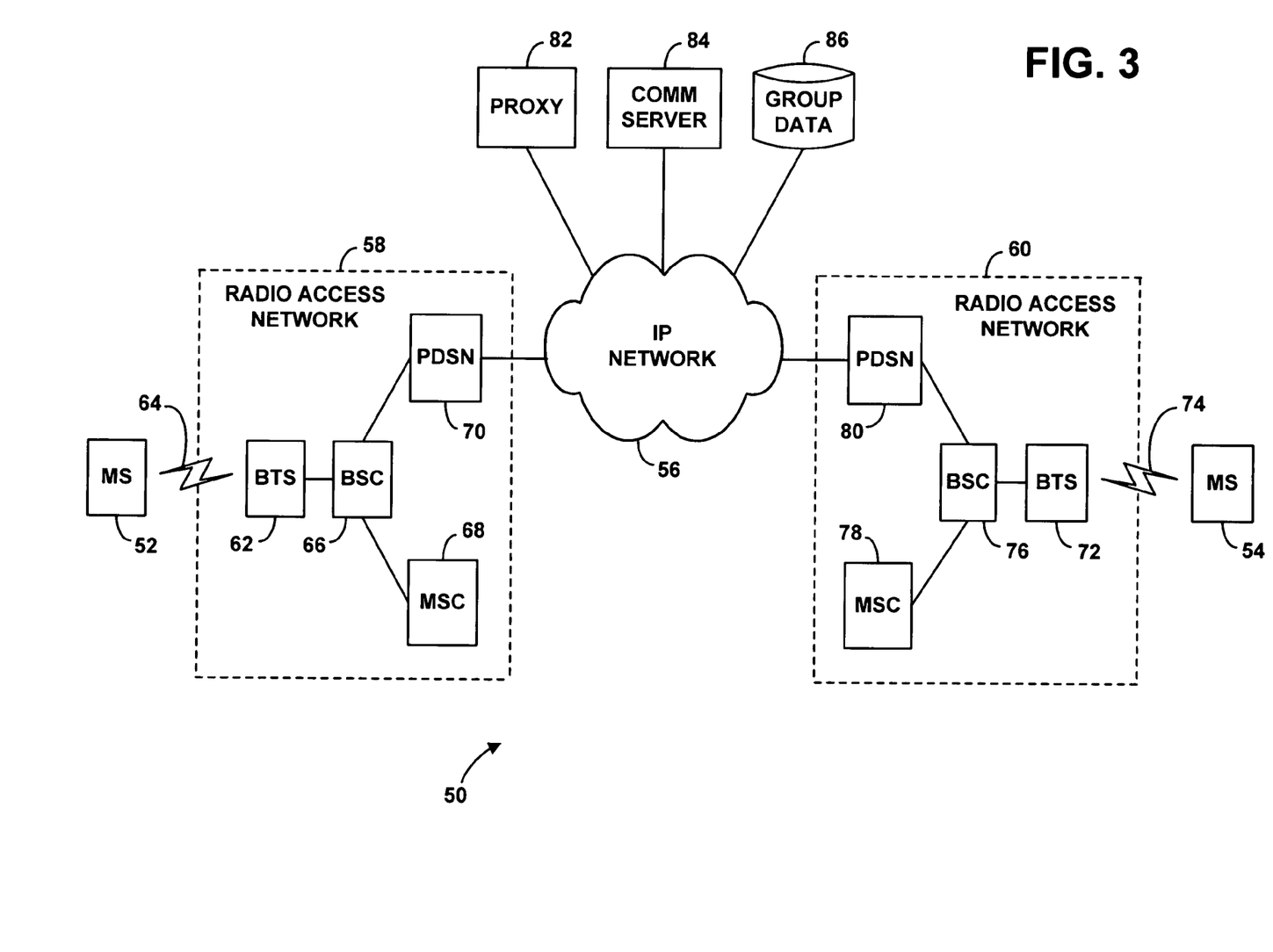
FIG. 3 is a block diagram of a wireless communication system in which an instant-connect service, such as push-to-talk, could be carried out.

As indicated above, real-time media conferencing such as that described in the preceding section can be employed to provide an instant-connect service, such as PTT service for instance. FIG. 3 illustrates an exemplary wireless communication system 50 in which such a service could be provided. It should be understood, however, that PTT or other instant-connect service could be provided in other arrangements as well, whether wireless and/or landline.

Exemplary wireless communication system 50 includes a number of mobile stations, such as mobile stations 52 and 54 for instance. Each mobile station (MS) can be linked by a radio access network with an IP network 56. As shown by way of example, MS 52 is linked by a first radio access network 58 with the IP network, and MS 54 is linked by a second radio access network 60 with the IP network. Alternatively, both MS 52 and MS 54 can be linked with the IP network by a common radio access network. Other alternatives are possible as well.

Each radio access network provides wireless connectivity with the IP network and can take any of a variety of forms. By way of example, radio access network 58 may include a base transceiver station (BTS) 62 that can communicate with MS 52 over an air interface 64. BTS 62 may then be coupled with a base station controller (BSC) 66, which may in turn be coupled with a mobile switching center (MSC) 68 and with a packet data serving node (PDSN) 70 or other gateway to the IP network 56. (At times, a BTS and BSC in combination may be referred to as a "base station.") Similarly, radio access network 60 may include a BTS 72 that can communicate with MS 54 over an air interface 74. BTS 72 may then be coupled with a BSC 76, which may in turn be coupled with an MSC 78 and with a PDSN 80 or other gateway to the IP network 56.

As another example, either or both of the radio access networks could comprise a base station that itself functions as a gateway with the IP network, without use of a PDSN or other gateway to the network. And as another example, MS 52 and MS 54 could communicate at least in part via a common radio access network, such as through a common PDSN, a common BSC and/or a common BTS. Other examples are also possible.

As a general matter, in order for a mobile station such as mobile station 52 or 54 to engage in packet-based media conferencing, it would need to acquire both a radio link layer connection with its radio access network and a data link layer connection with the IP network 56. The manner in which the mobile station acquires these connections might vary depending on the protocol used for communication over the air interface. In the exemplary embodiment, for instance, each air interface may be a code division multiple access (CDMA) air interface, and communications between each mobile station and the radio access network may comply with an industry standard such as cdma2000, which is published by the 3rd Generation Partnership Project 2. However, the air interface could follow other protocols as well, such as TDMA, GSM or 802.11x for instance.

Under cdma2000, to establish a packet-data connection, a mobile station would send a packet-data origination request over a common air interface channel (such as a reverse link access channel) to the MSC and would include in the request a "packet data" service option code that indicates a desire to establish a packet-data connection. In response to the "packet data" service option code, the MSC may then send the request to the BSC for processing.

In turn, the BSC may then establish a radio link layer connection with the mobile station, by directing the mobile station to operate on a particular traffic channel over the air interface (e.g., a fundamental traffic channel, and perhaps one or more supplemental channels). In addition, the BSC may pass the initiation request to the PDSN, and the PDSN and mobile station may then negotiate with each other to establish a data-link layer connection, typically a point-to-point protocol (PPP) session, over which packet data can be communicated between the mobile station and the PDSN. Further, the PDSN may assign a mobile-IP address to the mobile station, which the mobile station can use as its network address for communicating with other entities on the packet-switched network.

In order to conserve air interface resources, the radio-link layer connection with the mobile station may be arranged to time-out after a predefined period of inactivity. For instance, after 10 seconds in which no data is communicated to or from the mobile station over the assigned traffic channel, the BSC might programmatically release the traffic channel, allowing the channel to be used by other mobile stations instead. At the same time, however, the data-link layer (e.g., PPP) connection with the mobile station might remain, so the mobile station may retain its IP address.

Once the radio-link layer connection with a mobile station has timed out, the mobile station will be considered "dormant." However, if its data-link layer connection still exists, the mobile station may still seek to send packet data to other entities, and other entities may seek to send packet data to the mobile station. When another entity seeks to send packet data to the mobile station, the BSC will page the mobile station over an air interface paging channel.

When a dormant mobile station receives a page indicative of an incoming data communication, or if the dormant mobile station seeks to send data, the radio link layer connection with the mobile station will need to be reestablished. To do so, the mobile station may send a message to the BSC over the access channel, requesting radio-link resources, and the BSC may then assign a traffic channel. The mobile station may then send or receive packet data over that traffic channel.

As further shown in FIG. 3, a number of other entities may be coupled with (or may sit as nodes on) IP network 56. These other entities may include a proxy server 82, a communication server 84, and a group data store 86. The proxy server 82 can be a SIP proxy server that functions to receive and forward SIP signaling messages, such as SIP INVITE requests. And the communication server 84 may be a PTT server that functions to establish and carry PTT sessions between MS 52 and MS 54 and/or between other stations (landline or wireless) linked with IP network 56. Group data store 86 may then define groups of subscribers set to communicate with each other.

These entities may be arranged in any of a variety of ways. For example, group data store 86 may reside on a discrete database server that is coupled with the IP network 56 and that is accessible by communication server 84. Or group data store 86 may reside within communication server 84 or proxy server 82. And as another example, the function of proxy server 82 may be integrated with the function of communication server 84. Other examples are also possible.

b. Example Component Architecture

Figure 4:
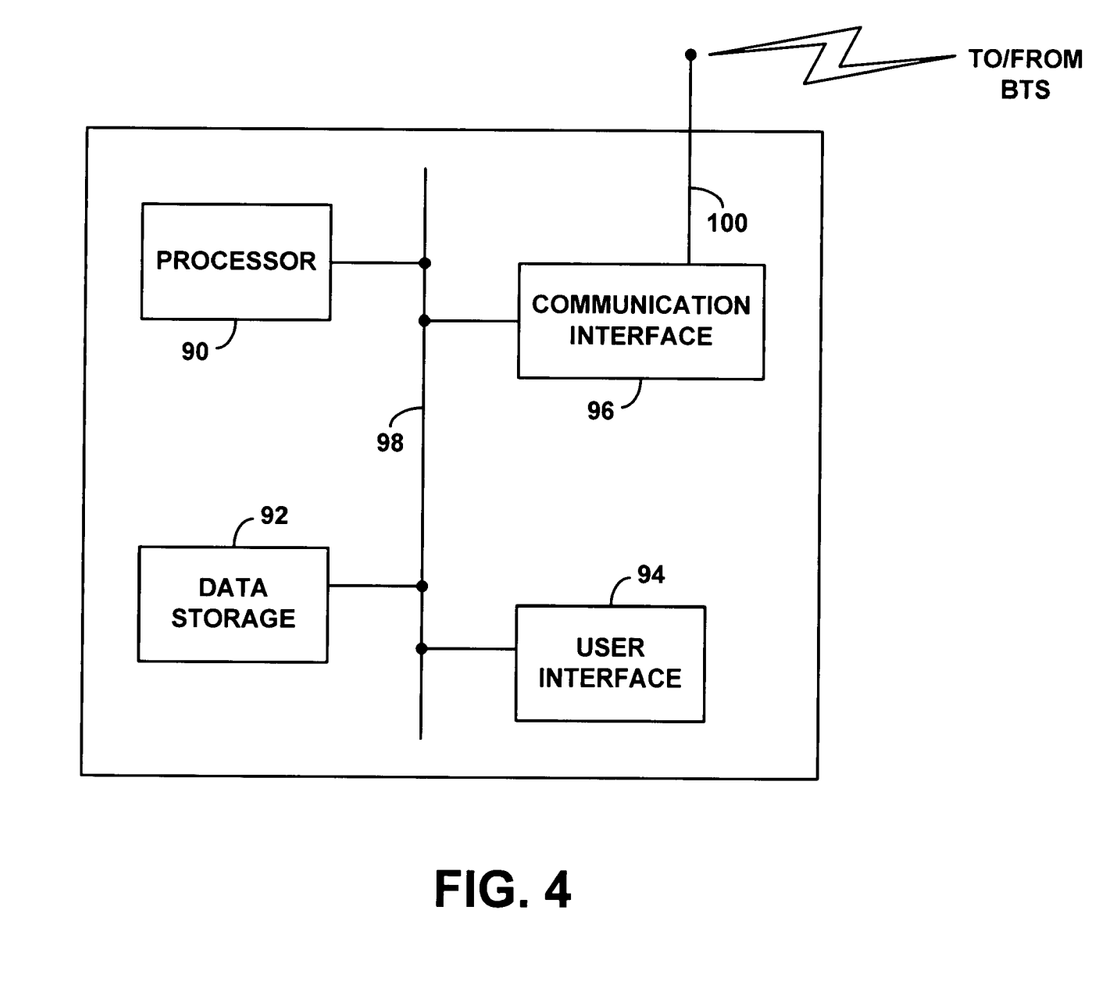
FIG. 4 is a block diagram of a mobile station operable in the arrangement of FIG. 3.

MS 52 and MS 54 may each take various forms and may be the same as or different than each other. To help illustrate, FIG. 4 is a simplified block diagram depicting an exemplary mobile station. As shown in FIG. 4, the exemplary mobile station includes a processor 90, data storage 92, a user interface 94, and a wireless communication interface 96, all of which may be coupled together by a system bus or other mechanism 98.

Each of these components may take various forms, the particular details of which are not necessarily critical. For instance, processor 90 may be general purpose microprocessor (e.g., an Intel Pentium class processor) or a dedicated processor, either of which could integrate part or all of data storage 92. And data storage 92 may be volatile and/or non-volatile storage (such as flash memory and/or a storage drive).

User interface 94 may facilitate interaction with a user. As such, the user interface may include media input and output mechanisms. To facilitate voice communications, for instance, these mechanisms might include a microphone (not shown) for receiving analog speech signals from a user, and a speaker (not shown) for playing out analog speech signals to a user. (Further, the mobile station will likely include digital/analog conversion circuitry (not shown) for converting between analog media signals and digital representations of those signals.)

In addition, the user interface 94 may include a display, speaker or other mechanism (not shown) for presenting information and menus to a user, as well as an input mechanism (e.g., keyboard, keypad, microphone, mouse, and/or touch-sensitive display overlay) (not shown) for receiving input from a user. For PTT functionality, the input mechanism may also include a PTT button (not shown) or other mechanism that a user can readily engage in order to initiate PTT communication.

Wireless communication interface 96, in turn, may facilitate communication over an air interface with a respective base station, in compliance with an air interface protocol, such as CDMA, TDMA, GSM or 802.11x for instance. As such, the wireless communication interface may comprise a dedicated chipset (not shown) coupled with an antenna 100 for sending and receiving signals over the air interface.

In the exemplary embodiment, data storage 92 holds a set of logic (e.g. computer instructions) executable by processor 90 to carry out various functions described herein. (Alternatively or additionally, the logic may be embodied in firmware and/or hardware.) Preferably, the logic defines various core functions to facilitate wireless packet-data communication and real-time media conferencing such as PTT communication, as well as supplemental logic to facilitate the enhanced functionality that will be described below.

To facilitate wireless packet data communication, for instance, the logic may function to establish a data connection automatically when the mobile station is powered on, or in response to a user request or a page signal. For instance, the logic may be arranged to generate and send a packet-data origination request into the network as described above, and to receive a traffic channel assignment from a BSC, to establish a PPP session with a PDSN, and to receive an IP address assignment to use for packet-data communications.

To facilitate real-time media conferencing, the logic may be compliant with SIP and RTP as described above with reference to the user stations in FIG. 1. For instance, in response to a user request to initiate a conference (e.g., by pressing the PTT button with the mobile station is not currently involved in a PTT session), the logic may function to send a SIP INVITE (via proxy server 82) to communication server 84, to receive a SIP 200 OK in response from the server, and to then send a SIP ACK to the server. Further, in response to a SIP INVITE from the conference server inviting the mobile station to participate in a conference, the logic may function to send a SIP 200 OK to the server and to then receive from the server a SIP ACK.

Further, the logic may facilitate sending, receiving and playing out of media signals. In this regard, for instance, the logic may function to receive media signals from a media input mechanism and to encode and packetize outgoing media signals as RTP/UDP/IP (or perhaps RTP/TCP/IP) packets for transmission via communication interface 96 and via the radio link and data link to one or more other entities on EP network 56. Similarly, the logic may function to depacketize and decode incoming media signals provided by communication interface 96 and to pass the decoded signals to one or more media output mechanisms for playout to a user.

Still further, the logic preferably facilitates interaction with a user through user interface 94. As such, the logic might define user interface scripts that can cause various data or information to be presented by user interface 54 to a user. Further, the logic may function to receive user input (such as selections made in response to the user interfaces) from user interface 94 and to respond accordingly.

In this regard, the logic might define a core PTT application with which a user can interact in order to select a target user or group with whom the user wants to engage in a PTT session, or in order to carry out other PTT related actions (such as configuring various use settings, for instance). Such an application could conventionally present a user with one or more menus or links through which a user could navigate in order to take certain actions.

For instance, the user might invoke the application and then browse to a menu that presents a list of predefined target users or groups, and the user may select one of the list entries. The user may then press the PTT button on the mobile station in order to initiate a PTT session with the selected user or group. In response, as noted above, the logic could then generate and send a SIP INVITE seeking to set up the requested PTT session.

Each BTS, BSC, MSC, and PDSN shown in FIG. 3 can largely be a conventional component of a radio access network, such as may be provided by Sprint PCS for instance. Therefore, these components are not described here in detail. (As examples, each BTS can be a Motorola SC4812, SC611, SC614 or SC4850, each BSC can be a Nortel BSS or a Motorola CBSC, each MSC can be Lucent 5ESS, and each PDSN can be a Nortel Shasta 5000 or a CommWorks Total Control 1000. Other examples are also possible.)

In turn, proxy server 82, communication server 84 and group data store 86 can also take various forms. For example, proxy server 42 can comprise a SIP proxy server application running on a computer at a defined IP address on network 56. As such, the computer could function strictly as a SIP proxy server, or it could be a more complex platform (e.g., "service agent") that manages all packet-data communications involving mobile stations.

Group data store 86 can hold data reflecting PTT groups and PTT users. For instance, the group data store 86 can include a listing of PTT groups and, for each group, could identify users who are members of the group. Each user could be identified by a SIP address or by another identifier such as a MIN (mobile identification number) of the user's mobile station. Further, the group data store 86 can include data that correlates user/station identifiers with SIP addresses, for use in determining SIP addresses of target users.

Figure 5:
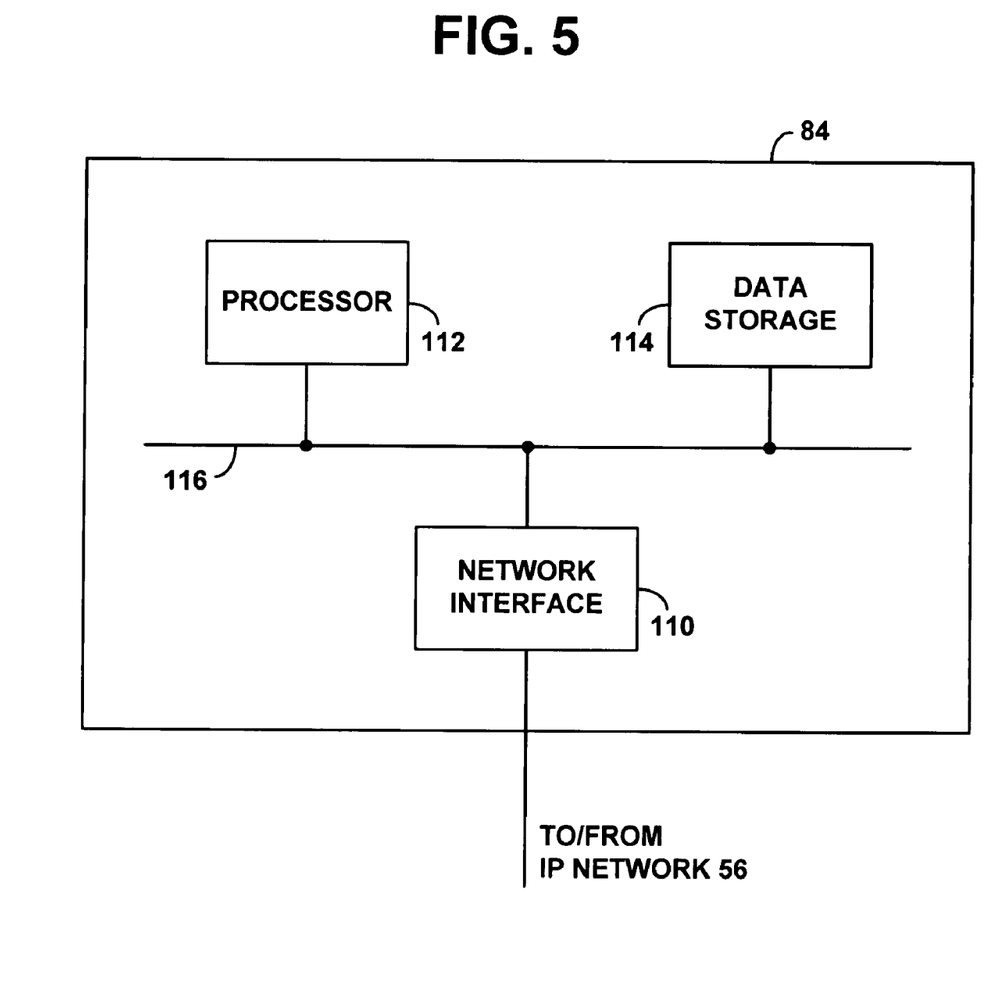
FIG. 5 is a block diagram of a communication server operable in the arrangement of FIG. 3.

Communication server 84, in turn, may comprise a conference server that also sits at a defined address on IP network 56. Referring to FIG. 5, a generalized block diagram of a representative server 84 is shown. As illustrated, exemplary server 84 includes a network interface unit 110, a processor 112, and data storage 114, all tied together via a system bus, network or other mechanism 116.

Network interface unit 110 functions to provide connectivity with EP network 56. As such, network interface unit 110 may receive packets from the IP network and may route packets independently over the IP network to designated IP addresses. A suitable network interface unit is Ethernet card, but other examples are also possible.

Data storage 114 then preferably holds machine language instructions and/or other logic executable by processor 112 to carry out various functions described herein. (Alternatively or additionally, some such functions could be carried out by hardware and/or firmware). As such, the logic may define various functions to facilitate network communication and media conferencing such as PTT communication.

For example, the logic may function to set up, tear down and bridge conference sessions between client stations such as MS 52 and MS 54. As such, the logic could define a SIP client application to engage in signaling with each client station, and an RTP application to facilitate receiving and sending RTP media streams.

Thus, in practice, the logic could operate to receive from an initiating mobile station a SIP INVITE that identifies a target user or group, to query group data store 86 to determine a SIP address of each target user, and to engage in further SIP signaling with the initiating station and with each target user's station so as to set up an RTP conference leg with each user. The logic may then function to bridge those legs together, in order to allow the users to communicate with each other.

3. Buffering of Media

As noted above, the impact of latency that occurs in setting up a packet-based real-time media session can be reduced by having an initiating station begin to buffer an initial media transmission when the station determines that it has successfully acquired a data connection.

Figure 6:
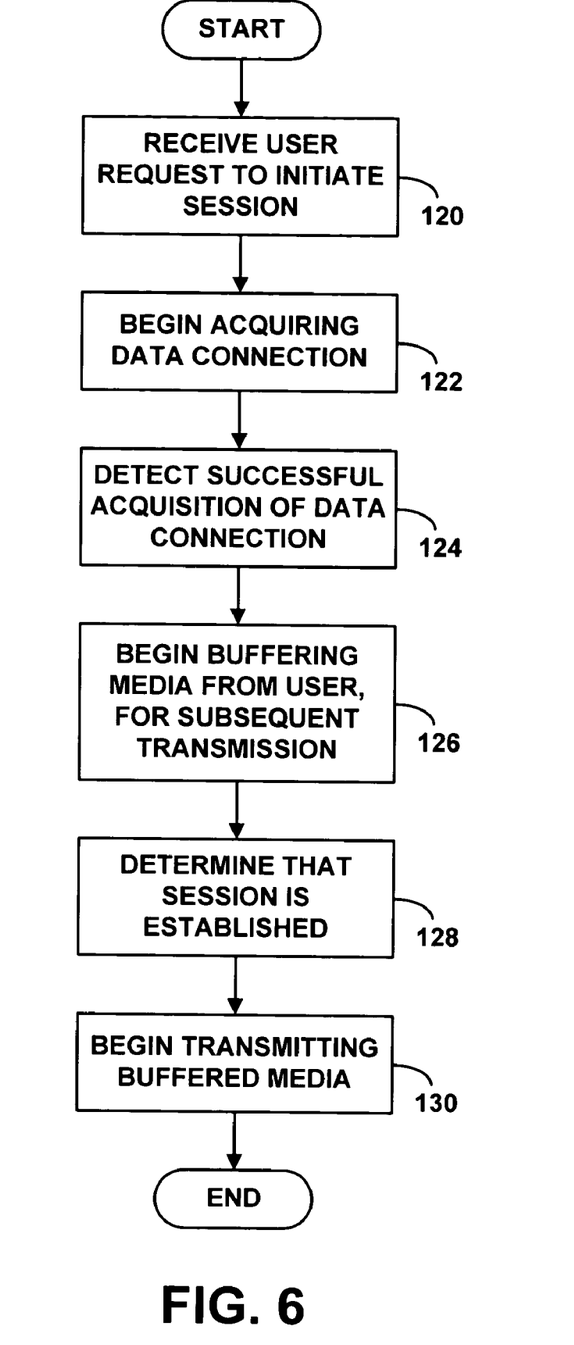
FIG. 6 is a flow chart depicting functions that could be carried out in accordance with the exemplary embodiment.

An example of this process is generally illustrated in FIG. 6. As shown in FIG. 6, at block 120, a station receives a user request to initiate a packet-based real-time media session, such as a PTT session for instance. In response, at block 122, the station begins acquiring a data connection (such as a radio link and data link, for instance). At block 124, the station then determines that it has successfully acquired a data connection. And at block 126, the station responsively begins receiving media from the user and buffering the media for subsequent transmission.

At block 128, the station thereafter determines that a real-time media session (e.g., conference leg or full session) has been established, such as by receiving notice from a conference server. And at block 130, the station responsively begins transmitting the buffered media into the network, such as to the conference server.

According to a preferred embodiment, the user station can determine that it has successfully acquired a data connection by determining that it has received incoming packet data from the network. That is, when the user station first receives any incoming packet data from the network, the user station can logically conclude that it has successfully acquired a data connection, through which that packet-data traveled.

In this regard, the first packet-data that the user station receives from the network can take various forms. For example, it could be an IP packet carrying a SIP signaling message or carrying some other sort of data. Further, the packet-data could arrive in response to packet-data that the user station sent into the network (e.g., as a response message), or it could arrive for some other reason.

Referring back to FIGS. 1 and 2, for instance, after user station 12 sends a SIP INVITE message into the network to initiate a real-time media session, the first packet-data that the user station receives is a SIP 100 TRYING message from proxy server 18. Thus, if user station 12 receives a user request to initiate a real-time media session and responsively sends an INVITE message into the network, the user station may treat its receipt of a 100 TRYING message as evidence (or as a confirmation) that it has successfully acquired a data connection. Therefore, the user station 12 could responsively begin receiving and buffering media from user A.

Note that the user station could instead user other techniques to determine when it has acquired a data connection. For instance, if the station has application-layer logic responsible for the buffering process and lower-layer logic responsible for acquiring a data connection (and communicating through that data connection), the lower-layer logic could be configured to inform the application-layer logic when a data connection exists. However, the preferred technique is to simply conclude that a data connection exists when packet-data arrives.

According to the exemplary embodiment, a user station may also notify a user when the station is ready to begin buffering media, so the user can know when to begin speaking or otherwise providing media to the mobile station. For instance, the mobile station can present the user with a signal such as a light, a display icon, an audible tone or a physical vibration, once the mobile station determines that it has successfully acquired a data connection. In response to that signal, the user can then safely begin providing media to the mobile station, with little if any risk that the station would be unable to send the media into the network.

The user station that carries out this function can generally any type of user station that is able to acquire a packet-data connection and that can engage in real-time media communication. A good example of this is a mobile station such as MS 52 as shown in FIG. 3. Further, the station can be a PTT-capable mobile station as described above and as illustrated in FIG. 4, or could be another sort of PTT-capable station.

To carry out this buffering process in a mobile station as shown in FIG. 4, data storage 92 would preferably include buffer space for temporarily holding a real-time media signal, such as a bit stream that represents an outgoing initial media transmission. Further, data storage 92 could include supplemental program logic executable by processor 90 to carry out the buffering function with the timing described herein. That is, after the mobile station receives a session initiation request from a user, the logic could function to determine when the mobile station acquires a data connection and to then begin receiving and buffering media. Further, user interface 94 of the exemplary mobile station can include an LED that processor 90 can cause to light in response to a determination that the mobile station has acquired a data connection, so as to notify a user that the user can begin providing media to the mobile station.

Figure 7:
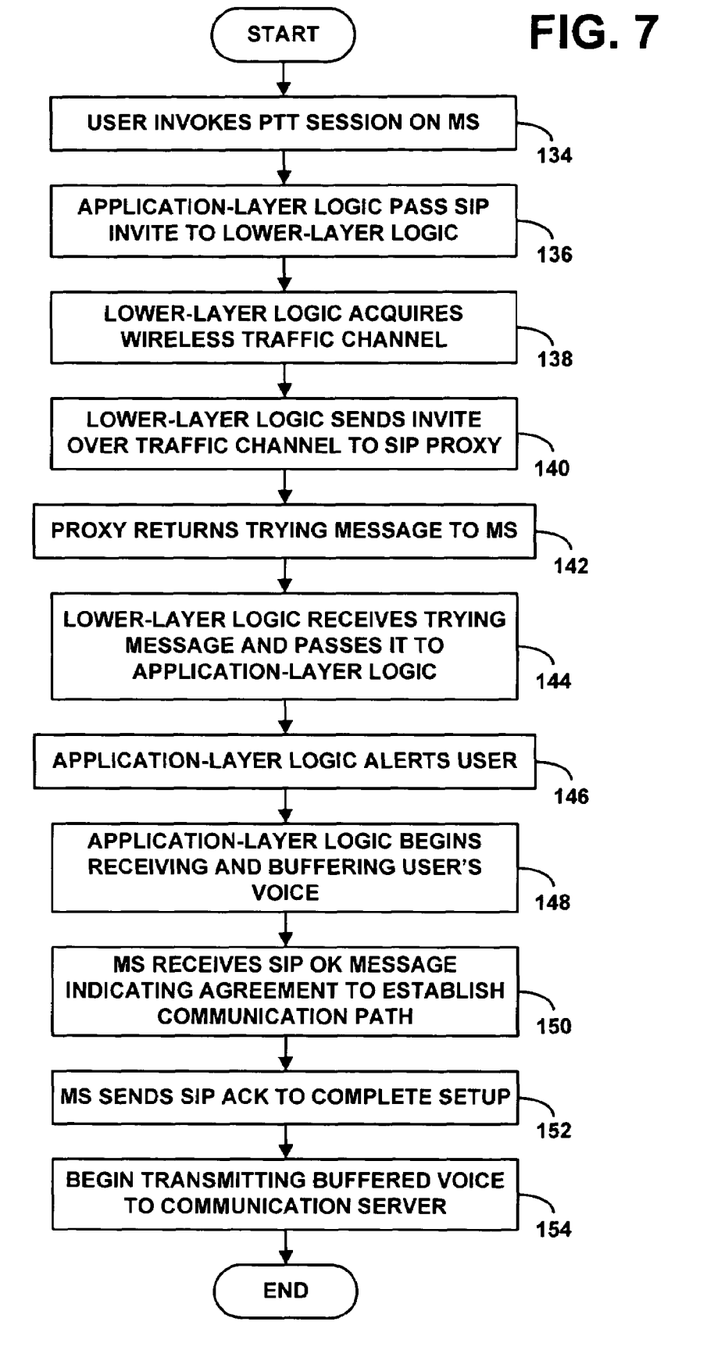
FIG. 7 is another flow chart depicting functions that could be carried out in accordance with the exemplary embodiment.

Referring next to FIG. 7, a more specific flow chart is now shown, to further illustrate how the buffering process could be carried out in an exemplary PTT system, in the wireless communication system shown in FIG. 3. This example assumes that MS 52 is the initiating station and is currently dormant, so MS 52 will need to acquire a radio link to have a data connection, i.e., in order to engage in packet-data communication such as SIP signaling.

As shown in FIG. 7, at block 134, an initiating user invokes a PTT session, such as by pressing a PTT button on MS 52. At block 136, application-layer logic in MS 52 responsively generates a SIP INVITE message destined to communication server 84 and passes the INVITE to lower-layer logic for transmission into the network.

To be able to send the INVITE message, at block 138, the lower-layer logic in MS 52 then seeks to acquire a traffic channel, such as by sending an origination request message to BSC 66 over an air interface access channel, and BSC 66 assigns the traffic channel. At block 140, the lower layer logic then sends the INVITE message via that traffic channel, for transmission in turn through radio access network 58 and IP network 56 to proxy server 82.

At block 142, proxy server 82 then sends a SIP 100 TRYING message to the IP address of MS 52, to indicate that signaling is in process. At block 144, the lower-layer logic in MS 52 receives the 100 TRYING message and passes is up to the application-layer logic for handling.

Receipt of the 100 TRYING message indicates to the application-layer logic that the mobile station has successfully acquired data connectivity. Therefore, at block 146, the application-layer logic may then alert the user that the user can begin speaking, such as by lighting an LED for instance. And at block 148, the application-layer logic may begin receiving and buffering the user's voice.

Thereafter, at block 150, MS 52 may receive from communication server 84 a SIP 200 OK message that signals that server's agreement to establish an RTP session (e.g., conference leg) with MS 52, and, at block 152, MS 52 may then send a SIP ACK message to complete signaling as described above. At block 152, with the RTP session established, MS 52 may then begin transmitting the buffered voice to the communication server, followed by any further voice that the user provides.

Note that, in the arrangement described above, when MS 52 sends a SIP ACK message to complete setup of an originating conference leg, the ACK message would pass to the communication server 20, and the communication server 20 would then send a SIP ACK message to MS 54 to complete set up of the terminating conference leg as well. In order to help ensure that MS 54 receives the ACK before the RTP stream reaches MS 54, it may be necessary to introduce some artificial delay in transmission of the RTP stream. The artificial delay could be introduced at MS 52, at communication server 20, or elsewhere.

Note also that this data-connection-triggered buffering process can be extended to apply with any real-time media signal being communicated from an initiating station to a terminating station. For example, if MS 52 is capable of sending video, MS 52 could begin receiving and buffering video once MS 52 determines that it has successfully acquired a data connection. And MS 52 could then begin transmitting the video to the communication server 84 once MS 52 learns that a communication session has been successfully established between MS 52 and the server. Other examples are also possible.

4. Conclusion

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method comprising:
receiving at a client station a user-request to initiate a real-time media session;
thereafter waiting for the client station to determine that the client station has acquired a data connection through which to initiate the requested real-time media session; and
in response to a determination that the client station has acquired the data connection, the client station beginning to buffer media provided by the user, for later transmission of the media into a packet-switched network.

2. The method of claim 1, wherein the media comprises voice, and wherein beginning to buffer the media comprises beginning to buffer a digital representation of the voice.

3. The method of claim 1, wherein the media comprises media selected from the group consisting of voice and video.

4. The method of claim 1, wherein the client station is a cellular mobile station, and wherein waiting for the client station to determine that the client station has acquired the data connection comprises waiting for the client station to determine that the client station has acquired a radio link layer connection.

5. The method of claim 1, further comprising:
making the determination that the client station has acquired the data connection.

6. The method of claim 5, wherein making the determination that the client station has acquired the data connection comprises:
determining that the client station has received incoming packet-data.

7. The method of claim 6, wherein determining that the client station has received incoming packet-data comprises:
determining that the client station has received a packet-based signaling message.

8. The method of claim 7, wherein the packet-based signaling message is a Session Initiation Protocol (SIP) TRYING message.

9. The method of claim 5, further comprising:
providing a notice to the user, in response to the determination that the client station has acquired the data connection,
whereby the notice serves to inform the user that the user should begin providing the media to the client station.

10. The method of claim 9, wherein the notice comprises a notice of the type selected from the group consisting of an audible alert and a visual alert.

11. A method comprising:
receiving into a client station a user-request to initiate a real-time media session;
in response to the user-request, the client station generating a packet-based session initiation message to send via a packet-switched network to a communication server;
the client station seeking to acquire a data connection over which to send the packet-based session initiation message;
the client station receiving a packet-based signaling message sent in response to the packet-based session initiation message; and
in response to receipt of the packet-based signaling message, the client station beginning to receive and buffer media from a user, for subsequent transmission over the packet-switched network to the communication server.

12. The method of claim 11, wherein the media comprises media selected from the group consisting of voice and video.

13. The method of claim 11, wherein receiving into the client station the user-request to initiate the real-time media session comprises detecting user actuation of an instant-connect button.

14. The method of claim 11, wherein the packet-based session initiation message is a Session Initiation Protocol (SIP) INVITE message, and the packet-based signaling message sent in response to the packet-based session initiation message is a SIP TRYING message.

15. The method of claim 14, wherein the client station is a wireless device, and wherein seeking to acquire a data connection over which to send the packet-based session initiation message comprises seeking to acquire a radio link layer connection with a radio access network.

16. A client station comprising:
a processor;
data storage;
program logic stored in the data storage and executable by the processor (i) to make a determination that the client station has acquired a data connection and (ii) in response to the determination, to begin buffering media provided by a user, for subsequent transmission of the media via a packet-switched network.

17. The client station of claim 16, further comprising a wireless communication interface, and wherein the data connection comprises a radio link layer connection with a radio access network.

18. The client station of claim 16, wherein the media comprises media selected from the group consisting of voice and video.

19. The client station of claim 16, further comprising a push-to-talk button for initiating a push-to-talk session.

20. The client station of claim 19, wherein the program logic stored in the data storage is executable by the processor to make the determination that the client station has acquired the data connection when the client station receives incoming packet data.

21. The client station of claim 20, wherein the incoming packet data comprises a Session Initiation Protocol (SIP) TRYING message.

* * * * *